United States Patent Office 2,962,816
Patented Dec. 6, 1960

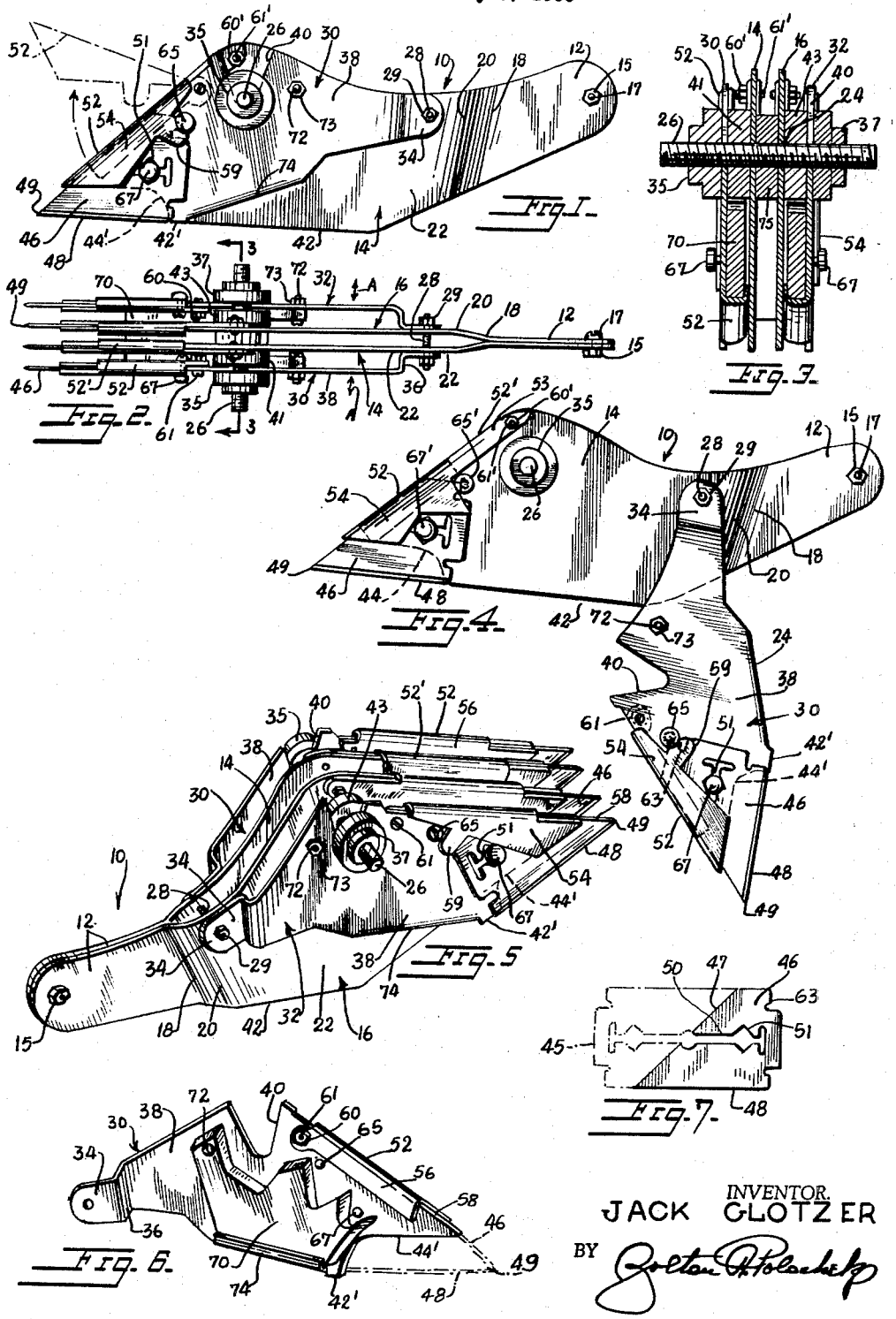

2,962,816

MULTIBLADE FUR SLICING TOOL

Jack Glotzer, 209 W. 64th St., New York 23, N.Y.

Filed July 7, 1959, Ser. No. 825,529

3 Claims. (Cl. 30—304)

This invention relates to the art of fur cutting devices and particularly concerns a multiblade fur cutting or slicing tool.

According to the invention there is provided a holder for a plurality of trapezoidal blades. The blades can be made from inexpensive types of conventional razor blades. The blades are held in a plurality of independent holders adjustably spaced so that the blades are disposed in parallel array to make a plurality of cuts in a fur piece simultaneously.

It is therefore a principal object of the invention to provide an improved multiblade fur cutting tool.

It is a further object to provide a fur cutting tool which supports a plurality of blades having forwardly disposed sharp points and adjacent cutting edges in parallel array.

It is a further object to provide a fur cutting tool of the character described with improved quick detachable retaining means for the several blades.

It is another object to provide improved means for adjustably spacing cutter blades in a fur cutting tool.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a tool embodying the invention.

Fig. 2 is a top plan view of the tool.

Fig. 3 is a sectional view taken on line 3–3 of Fig. 2.

Fig. 4 is a side elevational view of the tool with one blade holder pivoted away to show internal construction.

Fig. 5 is a perspective view of the tool.

Fig. 6 is a perspective view of one blade holder employed in the tool.

Fig. 7 is an elevational view of a blade used in the tool.

Referring to the drawings, there is shown the tool 10 including a handle formed by rear tapered ends 12 of a pair of polygonal plates 14 and 16 serving as inner blade holders. The ends 12 are juxtaposed and secured by nuts 15 and bolts 17. Double angular bends 18 and 20 are formed in each of the plates 14 and 16 so that the forward broader ends 22 of the plates are spaced from each other. The plates are formed with holes 24 through which extends a threaded rod or stem 26. Attached to the plates on the outer sides thereof near bends 20 are two outer blade holders 30 and 32. Each of these outer blade holders has a rear narrow end portion 34 juxtaposed to plate portion 22 and secured thereto by a screw 28 passing through all the plates and secured by nuts 29. The rear ends of the plates 30, 32 are formed with doubly bent portions 36 so that the forward portions 38 of the outer plates are normally spaced from the portions 22 of the inner spaced plates 14 and 16. Notches 40 are formed in the apical edges of the outer plates through which notches passes the stem 26. Nuts 35, 37 are engaged on the ends of the stem and tightened against the outer plates at the edges of notches 40 as clearly shown in Figs. 1–5.

The bent portions 36 are formed with flexible folds so that the plates 30, 32 can be spread apart or brought together as indicated by arrows A in Fig. 2. The plates are all formed of resilent or springy sheet metal such as brass, copper, stainless steel, or the like. Thus, by turning the nuts 35, 37 in or out on stem 26, it is possible to adjustably space the plates 14 and 30 and plates 16 and 32. Further nuts 41 and 43 are threaded on the stem 26 and disposed between plates 14, 30 and 16, 32 and may be tightened against the inner sides of plates 30, 32, respectively. The latter nuts coact with nuts 35, 37 in determining the precise positioning of the plates 30, 32 on the stem 26.

Each of the plates 14, 16 has a rather straight lower edge 42. This edge is formed with an inwardly extending recess 44. Blades 46 are disposed to abut the plates and extend beyond the recesses 44 so that their cutting edges 48 are substantially colinear with the edges 42 as shown in Fig. 4. Plates 30 and 32 have foreshortened edges 42' corresponding to edges 42 with corresponding recesses 44' at which the blades 46 are secured as shown in Figs. 1, 5 and 6.

Fig. 7 shows most clearly the trapezoidal form of a cutter blade 46. It may be formed most expeditiously and inexpensively by breaking a conventional rectangular two edge razor blade 45 along a line 47 oblique to edges 48 thereof. The single blade 45 will thus yield two like trapezoidal blades 46 each having a finely sharpened and honed long edge 48 terminating in a very sharp fine point 49 forming an angle of 45° at the intersection of edges 47 and 48. The central slot 50 normally provided in blade 45 is employed in securing the blade 46 removably to its support.

Each of the plates 30, 32 is provided with a clip 52 having a generally triangular leaf 54 which overlies the raw or broken edge 47 of the blade. The clip has a flange 56 bent over the upper forward edge 58 of each blade holder 30, 32 and pivotally secured thereto by a nut 60 and screw 61. Each leaf 54 has a depending finger 59 which overlays a cut-out corner 63 of the blade. The cut-out corner 63 is disposed in abutment with a pin 65 on each blade holder plate. Another pin 67 spaced from pin 65 is engaged in enlargement 51 of slot 50.

In Fig. 1 clip 52 is shown in dotted lines pivotable away from the edge 58 of plate 30 to release the blade 46 engaged thereon. When the clip 52 is pivoted to the solid line position of Fig. 1, the blade 46 is securely clamped or locked in the cutting position shown. The cutting edge 48 is located at the lower forward edge of the tool with the sharp point 49 in the foremost position. The blades are secured removably on plates 14 and 16 by similar clips 52' having elongated fingers 53 pivotally secured by nuts 60' and screws 61' at the upper edges 58' of the inner plates. Pins 65' and 67' on plates 14, 16 serve the same functions in anchoring the blades as the pins 65, 67 on plates 30, 32 as described above.

In order to prevent lateral movement of the forward ends of the blade holders in their most closely spaced position as shown in Figs. 2 and 3, there is provided a spacer member 70 in the inner side of each of plates 30, 32. The spacer member is secured by a screw 72 and nut 73 and by an inwardly turned flange 74 formed on the lower edge of each plate 30, 32. The outer edge of the spacer member seats in a groove 71 defined by the flange 74 as clearly shown in Fig. 6. A washer 75 may be disposed on stem 26 between plates 14 and 16 to fix the minimum spacing of these plates.

The notches 40 permit the plates 30, 32 to be pivoted on screw 28 away from stem 26 and the inner plates 14, 16 for exposing the inner blades as shown in Fig. 5. If desired, one or the other of the outer plates 30, 32 can be removed by disengaging nut 27 and screw 28 to constitute the tool a three-blade holder. If both plates 30 and 32 are removed, then the tool will become a two-blade holder.

The blades are readily removable and replaceable and the blade holders are adjustably spaceable as described above.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A fur cutting tool, comprising a plurality of spaced cutter members, each of said cutter members comprising a generally polygonal plate, said plate having a cut-out corner, a pair of spaced pins secured to said plate near said corner, a clip pivotally secured to the plate and overlaying an edge thereof near said corner, there being spacer elements secured between the several plates holding the same in spaced substantially parallel array, said plates having aligned openings, a stem extending through said openings, and a cutter blade removably secured to each plate at its cut-out corner, said spaced pins and clips constituting the securement of said blade, said spacer elements including nuts threaded on the stem passing through said plates, said nuts being adjustably positionable on said stem whereby the spacing of said members is rendered adjustable, some of said spacer elements being affixed to the plates to define minimum spacing between the plates.

2. A fur cutting tool, comprising a plurality of cutter members, each of said cutter members comprising a generally polygonal plate, said plate having a cut-out corner, a pair of spaced pins secured to said plate near said corner, a clip pivotally secured to the plate and overlaying an edge thereof near said corner, there being spacer elements secured between the several plates holding the same in spaced substantially parallel array, and a cutter blade removably secured to each plate at said cut-out corner, said pins holding said blade, two of said members having elongated portions secured together and defining a handle, others of said members being secured to said two members and pivotable away therefrom to expose the blades thereon, said spacer elements including nuts threaded on a stem passing through all of said members, said nuts being adjustably positionable on said stem whereby the spacing of said members is rendered adjustable.

3. A fur cutting tool, comprising a plurality of cutter members, each of said cutter members comprising a generally polygonal plate, said plate having a cut-out corner, a pair of spaced pins secured to said plate near said corner, a clip pivotally secured to the plate and overlaying an edge thereof near said corner, there being spacer elements secured between the several plates holding the same in spaced substantially parallel array, and a cutter blade removably secured to each plate at said cut-out corner, said pins holding said blade, two of said members having elongated portions secured together and defining a handle, others of said members being secured to said two members and pivotable away therefrom to expose the blades thereon, said spacer elements including nuts threaded on a stem passing through all of said members, said nuts being adjustably positionable on said stem whereby the spacing of said members is rendered adjustable, others of said spacer elements being affixed to certain of said plates to define minimum spacing between the plates.

References Cited in the file of this patent

UNITED STATES PATENTS

| | | |
|---|---|---|
| 2,270,970 | Schaftel | Jan. 27, 1942 |
| 2,464,206 | Becker | Mar. 15, 1949 |
| 2,493,244 | Gustafsen | Jan. 3, 1950 |
| 2,772,476 | Glotzer | Dec. 4, 1956 |